United States Patent
Orion

(10) Patent No.: US 9,384,091 B2
(45) Date of Patent: Jul. 5, 2016

(54) ERROR CODE MANAGEMENT IN SYSTEMS PERMITTING PARTIAL WRITES

(71) Applicant: ARM LIMITED, Cambridge (GB)

(72) Inventor: Luc Orion, Sophia Antipolis (FR)

(73) Assignee: ARM Limited, Cambridge (GB)

( * ) Notice: Subject to any disclaimer, the term of this patent is extended or adjusted under 35 U.S.C. 154(b) by 72 days.

(21) Appl. No.: 14/283,517

(22) Filed: May 21, 2014

(65) Prior Publication Data

US 2015/0039968 A1 Feb. 5, 2015

(30) Foreign Application Priority Data

Jul. 31, 2013 (GB) .................................. 1313657.7

(51) Int. Cl.
*H03M 13/00* (2006.01)
*G06F 11/10* (2006.01)

(52) U.S. Cl.
CPC ........ *G06F 11/1076* (2013.01); *G06F 11/1064* (2013.01); *G06F 2211/1088* (2013.01)

(58) Field of Classification Search
CPC ................ G06F 11/10; G06F 11/1076; G06F 2211/0188; G06F 11/1064
USPC ....................................................... 714/766
See application file for complete search history.

(56) References Cited

U.S. PATENT DOCUMENTS

| | | | |
|---|---|---|---|
| 4,204,634 A | 5/1980 | Barsuhn et al. | |
| 4,791,642 A * | 12/1988 | Taylor | G06F 12/0802 711/E12.017 |
| 4,817,095 A * | 3/1989 | Smelser | G06F 11/1056 362/201 |
| 5,369,651 A | 11/1994 | Marisetty | |
| 8,099,650 B1 | 1/2012 | Glasco et al. | |
| 2005/0132263 A1 | 6/2005 | Anderson et al. | |
| 2006/0123322 A1 | 6/2006 | Leung et al. | |
| 2007/0079185 A1* | 4/2007 | Totolos, Jr. | G06F 11/106 714/718 |
| 2007/0113155 A1 | 5/2007 | Takahashi | |
| 2012/0151298 A1 | 6/2012 | Nicholes | |
| 2013/0007574 A1 | 1/2013 | Langadi et al. | |
| 2014/0089602 A1* | 3/2014 | Biswas | G06F 12/0804 711/144 |
| 2014/0344643 A1* | 11/2014 | Hughes, Jr. | G06F 11/1048 714/763 |

OTHER PUBLICATIONS

K.M. Lepak et al, "Silent Stores for Free" University of Wisconsin, Micro-33, Dec. 2000, 36 pages.
B.T. Gold et al, "Mitigating Multi-bit Soft Errors in L1 Caches Using Last-Store Prediction" 2007, 8 pages.
Search Report for GB1313657.7 dated Jan. 15, 2014.

* cited by examiner

*Primary Examiner* — David Ton
(74) *Attorney, Agent, or Firm* — Nixon & Vanderhye P.C.

(57) ABSTRACT

A memory 10 stores a data block comprising a plurality of data values DV. An error code, such as an error correction code ECC, is associated with the memory and has a value dependent upon the plurality of data values which form the data block stored within the memory. If a partial write is performed on a data block, then the ECC information becomes invalid and is marked with an ECC_invalid flag. The intent is avoiding the need to read all data values to compute the ECC and thus save time and energy. The memory may be a cache line 28 within a level 1 cache memory 10. Memory scrub control circuitry 38 performs periodic memory scrub operations which trigger flushing of partially written cache lines back to main memory.

15 Claims, 5 Drawing Sheets

ERROR CODE MANAGEMENT IN SYSTEMS PERMITTING PARTIAL WRITES

BACKGROUND

This application claims priority to GB Application No. 1313657.7 filed Jul. 31, 2013, the entire contents of which are incorporated herein by reference.

This invention relates to the field of data processing systems. More particularly, this invention relates to the management of the generation and use of error codes associated with data values stored within data blocks within a memory.

It is known to provide memories with error codes derived from the data values stored within those memories. Typically the data values are divided into data blocks comprising a plurality of data values and an error code is generated having a value dependent upon the plurality of data values. Examples of error codes include error correcting codes, parity values and other forms of error detection and correction codes. Error codes may serve to detect errors or to both detect and correct errors. If the data values stored within the memory are corrupted for some reason, such as a soft error due to a particle strike, then the error codes may be used to detect that corruption and potentially correct that corruption. This increases the reliability of the data processing system.

It is known to provide data processing systems in which partial (narrow) writes of data to a block of data stored within a memory may be performed. As one example, an error code may be computed for a data block comprising a word (e.g. 32 bits). If a write to an individual byte within such a word takes place, then the remaining bytes of the word must be read from memory (if not already available) in order to compute the error code. This represents a significant time and energy overhead. As another example, a cache memory may be divided into cache lines with each cache line storing a plurality of data values. An error correction code may be calculated for the plurality of data values constituting a cache line and serves to provide a degree of protection against corruption for the data values held within that cache line. If a write of a data value is made to a memory location which is not currently stored within the cache memory, then a cache line within the cache memory may be allocated to the data block containing that data value. If all of the data values of that cache line are written, then the error correction code for that cache line may be calculated and stored. However, if a partial write of the data values within that cache line is performed, then it is necessary to fetch from the main memory the remaining data values which constitute that cache line in order that the correct error correction code can be determined for that cache line. The error correction code is dependent on all of the data values within the cache line. The necessity to read the data values from elsewhere that have not been written into the cache line causes a significant additional overhead in terms of time and energy. This requirement also requires a more complex design.

SUMMARY

Viewed from one aspect the present invention provides apparatus for processing data comprising:

error code generating circuitry configured to generate an error code for a data block comprising a plurality of data values, said error code having a value dependent upon said plurality of data values; and a memory configured to store one or more data values of said data block and said error code; wherein said error code generating circuitry is configured such that:

(i) when one or more data values within said data block are written to said memory and all data values within said data block are stored within said memory, said error code generating circuitry generates an updated value of said error code for said data block; and (ii) when one or more data values within said data block are written to said memory and a proper subset of said data values within said data block are stored within said memory, said error code generating circuitry marks as invalid said error code for said data block.

The present technique recognizes that in the case of a partial write, where a proper subset of the data values within a data block are written, the reduction in overhead that may be achieved by foregoing error code protection for that data block, and so requiring all data values for the data block to be available, more than compensates for the increase in risk associated with potential corruption of that partially written data block. In practice, relatively few data blocks will be partially written in this way and accordingly, on a statistical basis, the error code protection for the memory as a whole remains strong, i.e. the rate of partial writes is relatively low and, in the case of cached data blocks, the cache allocation policy will tend to reduce the time data blocks with an invalid error code remain in the cache.

The error code could take a variety of different forms. In some embodiments, the error code may simply serve to detect errors using error detecting circuitry in order to trigger an error response. Simply knowing that a data value has been corrupted may be enough to avoid erroneous processing taking place based upon that data value.

In other embodiments the error code may be an error correcting code in which case error correcting circuitry uses the error code to both detect that an error has occurred and then correct at least one error (one or more incorrect bits) within the data block. Such error correcting codes provide increased robustness in data processing systems. Various forms of error correcting codes may be used, e.g. double error detect and single error correct, and the present techniques may be applied to all such codes.

The error code for a data block may be marked as invalid in a number of different ways. In some embodiments an error-code-invalid flag may be associated with the data block. In other embodiments a dedicated value of the error code may be used to indicate that the data block does not have a valid error code associated with it, i.e. the error code is not able to perform its function of error detection/correction.

As previously mentioned, the error code could take a variety of different forms such as, but not limited to, an error correcting code for the data block a parity code for the data block or an error detecting code of some other form for the data block.

The memory which stores the data block may have a variety of different forms. For example, the memory could be a buffer memory within interconnect circuitry of an integrated circuit. Another example form of the memory is a write buffer within a memory controller. The memory is not limited to such forms and encompasses storage for data values generally at any point in a data processing system. In all of these instances, partial writes of a data block may be performed and in this circumstance the present technique may be used to mark any associated error code as invalid rather than requiring the full content of the data block to be read to that memory in order that proper error code may be calculated.

While it will be appreciated that the memory can take a variety of different forms and applies to data blocks in general, one form in which the present technique is particularly useful is when the memory is a cache line within a cache memory (i.e. a cache line is the data block). The error code generating circuitry within such embodiments may be configured to generate respective error codes for the different cache lines such that each cache line is protected by its own error code. Cache memories can be large structures and accordingly the use of small transistors may be advantageous. However, such small transistors are more prone to soft errors and accordingly error codes are useful in providing increased reliability. Furthermore, cache memories tend to be employed in order to reduce latency associated with accessing data. In this context, a requirement to read a full cache line back to fill in missing data values within a cache line which has been partially written represents a significant and disadvantageous overhead. In practice, a better balance between robustness and performance is achieved when error codes are marked as invalid for partially written cache lines.

In the context of a cache memory, the data values may be stored within a data RAM and the error code, as well as an invalid flag for that error code, may be stored within the data RAM, or in other embodiments in an associated TAG RAM. In the case of a data block with a standard RAM memory, the error codes and invalid flag would also be stored within that RAM memory.

Cache memories which are most latency sensitive, and accordingly in which the present techniques may be used with particular advantage, are level 1 cache memories. However, the present techniques can be employed at any level with a memory hierarchy, e.g. level 2 cache, main memory, buffers etc.

The partial writes of data values to a data block may be generated in a number of different ways, such as I/O circuitry for receiving data values of memory mapped data blocks. However, in some embodiments processing circuitry is configured to execute program instructions which perform the partial write to a proper subset of the data values within a data block. Such program generated partial writes arise for a number of reasons. Other sources of partial writes include DMA circuitry.

It will be appreciated that the data blocks which have an invalid error code subsequent to a partial write are vulnerable to corruption (soft errors, such as due to particle strikes). However, these vulnerabilities may be reduced by the provision of scrubbing circuitry coupled to the memory and configured to perform a periodic memory scrub operation in which data values of data blocks are checked with their error code and if a data block is indicated as containing an invalid error code, then all the data values for that data block are fetched and written to the memory and the error code is updated. Such scrubbing circuitry is typically already provided in order to perform routine background maintenance upon data values within data blocks using the error codes (e.g. to check for stuck-bit errors). Scrubbing circuitry itself is not new, but it does provide a synergy with the present techniques by helping reduce the probability that a data block with an invalid error code will remain in the cache. The error codes and scrubbing operations may be used to prevent the build up and propagation of errors within the stored data values by correcting any errors before the number of these errors within any data block exceeds the capability of correction by the error code. Using these background operations, data blocks which have undergone partial writes, and accordingly do not have a valid error code, may during a memory scrub operation be subject to a full write (with the remaining data values being sourced from elsewhere) and then a valid error code associated with that data block in order to provide that data block with ongoing protection. Such maintenance to provide protection for data blocks with at least partially invalid error codes can be added to the other functions of memory scrub circuitry that can be, for example, performed a few lines at a time within a cache memory.

The memory may be part of a memory hierarchy including at least one higher order memory relative to the memory being protected with the error codes discussed above. Within this context, the memory scrubbing circuitry can read any data values for the data block not present within the memory from such a higher order memory. As an example, a level 1 cache may be the memory which is protected with the error codes and a higher order main memory may be used to store data values corresponding to those within the cache memory and accordingly missing data values within a cache line which has been subject to a narrow write may be read from the main memory in order that an error code for that cache line may be subsequently generated.

The data values which are protected may be a plurality of data bytes and a data block may be a data word. For example, the data block may be a 32-bit data word or a 64-bit data word. Other data value sizes and data block sizes are also possible.

Viewed from another aspect the present invention provides apparatus for processing data comprising:

error code generating means for generating an error code for a data block comprising a plurality of data values, said error code having a value dependent upon said plurality of data values; and memory means for storing one or more data values of said data block and said error code; wherein said error code generating circuitry is configured such that:

(i) when one or more data values within said data block are written to said memory means and all data values within said data block are stored within said memory means, said error code generating means generates an updated value of said error code for said data block; and (ii) when one or more data values within said data block are written to said memory means and a proper subset of said data values within said data block are stored within said memory means, said error code generating means marks as invalid said error code for said data block.

Viewed from a further aspect the present invention provides a method of processing data comprising the steps of:

generating an error code for a data block comprising a plurality of data values, said error code having a value dependent upon said plurality of data values; and storing within a memory one or more data values of said data block and said error code; wherein said step of generating operates such that:

(i) when one or more data values within said data block are written to said memory and all data values within said data block are stored within said memory, said step of generating generates an updated value of said error code for said data block; and (ii) when one or more data values within said data block are written to said memory and a proper subset of said data values within said data block are stored within said memory, said step of generating marks as invalid said error code for said data block.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
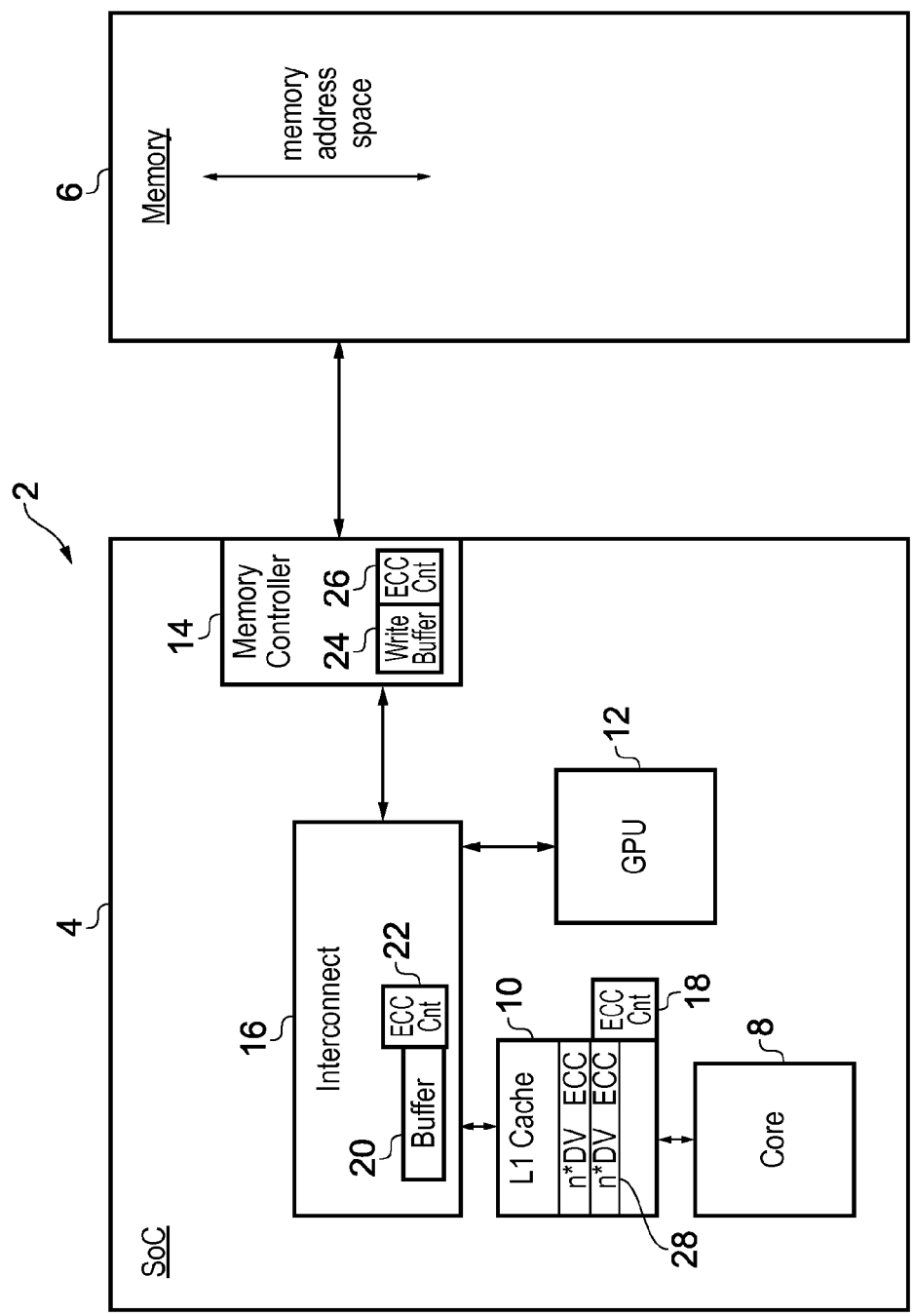
FIG. 1 schematically illustrates a data processing system.

FIG. 1 schematically illustrates a data processing system 2 including a system-on-chip integrated circuit 4 and a main memory 6. The system-on-chip integrated circuit 4 includes a processor core 8 for executing program instructions, a level 1 cache memory 10, a graphics processing unit 12 and a memory controller 14, all connected via interconnect circuitry 16. The level 1 cache memory 10 has an associated error correction code controller 18. The interconnect circuitry 16 includes a buffer memory 20 for buffering a data block comprising multiple data values that is being communicated via the interconnect circuitry 16.

An error correction code controller 22 is associated with the buffer memory 20 and serves to generate and use error correction codes for the data values stored within the buffer memory 20. The memory controller 14 includes a write buffer memory 24 having an associated error code controller 26. The write buffer 24 stores data values to be written out to the main memory 6. These data values may be part of data blocks and partial (narrow) writes may be performed to these data blocks. The error correction code control circuitry 26 serves to generate error correction codes associated with the blocks of data values stored within the write buffer 24.

The above describes the use of the present techniques in the context of example memories and ECC codes, but the present techniques are not limited to these examples.

The level 1 cache memory 10 includes a plurality of cache lines 28. Each cache line includes a plurality of data values DV and has an associated error correction code ECC. As will be described later, if a partial write has occurred to a cache line 28, then that line will store a proper subset (less than all) of the data values mapped to that cache line 28 and accordingly the error correction code will be marked as invalid as not all of the data values needed to generate an error correction code for that cache line 28 are present within the cache line 28. In a similar way, narrow writes can occur to the buffer memory 20 of the interconnect circuitry 16 and/or to the write buffer memory 24 of the memory controller 14. When such narrow writes occur, then the error correction code associated with the data block to which a narrow write has been made within these other forms of memory may be marked as invalid.

The main memory 6 supports a memory mapped address space. The level 1 cache memory stores cache lines 28 which are mapped to respective memory addresses within this memory address space. A TAG value stored within the level 1 cache memory 10 is used to record to which portion of the memory address space an individual cache line 28 is mapped.

Figure 2:
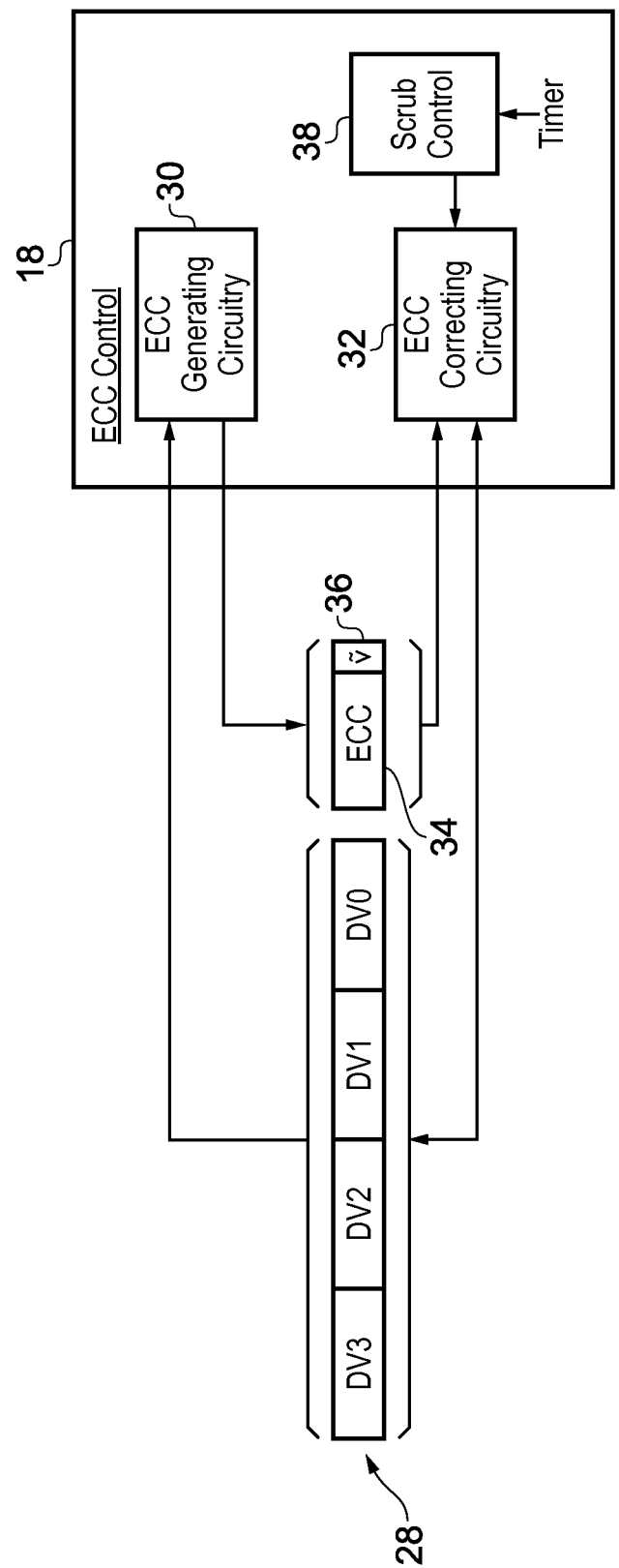
FIG. 2 schematically illustrates a memory, in the form of a cache line, with associated error correction control circuitry.

FIG. 2 schematically illustrates a cache line 28 comprising four data values DV0-DV3. An error correction code ECC is associated with that cache line 28. The error correction code may be stored within a TAG RAM, but could be stored with the data values themselves or elsewhere. The error correction code control circuitry 18 includes error correction code generating circuitry 30 and error correction code correction circuitry 32.

The error correction code generating circuitry 30 serves to detect when a write occurs to the cache line 28. If the write is to all of the data values within the cache line 28, then the error correction code generating circuitry 30 generates an error correction code value 34. If the write is to a proper subset of the data values within the cache line 28 (i.e. less than all of the data values), then an error correction code 34 is not generated and instead an ECC_invalid_flag 36 is set. It is also possible that a particular value of the ECC code 34, which is not used to encode the error correction code for any possible plurality of data values, may be given the task of representing that the error correction code 34 is invalid. In such a circumstance a dedicated ECC_invalid_flag 36 need not be provided.

Error correcting circuitry 32 is provided to read an error correction code 34 and its associated data values for a cache line 28. The read data values are used to generate a new error correction code and this is compared to the one which has been read. If the two error correction codes do not match, then the likelihood is that one or more bits within the data values for the cache line have been corrupted and accordingly the stored error correction code for that cache line 28 may be used to correct the data values. It will be understood that the length of the error correction code 34 relative to the number of bits within the data block will typically control the number of simultaneous bit errors which may be detected and corrected e.g. double error detect and single error correct. Corrected data values, if generated, are written back by the error correcting circuitry 32 to the cache line 28.

The error correcting circuitry 32 could be triggered to perform these tasks when it was desired to read a data block from a cache line, or one or more data values from that cache line. However, another circumstance for initiating the action of the ECC correcting circuitry 32 is under control of a memory scrub controller 38 which is responsive to a periodic timer signal to initiate a memory scrub operation. At a low rate, or whenever a period of inactivity is detected, the scrub controller 38 may control the ECC correcting circuitry 32 to successively check for and correct errors within at least some of the cache lines 28 within the level 1 cache 10. This helps prevent the build up and propagation of bit errors within the data values. Not all the cache lines 28 need to be scrubbed at one time, but over an extended duration all will be scrubbed.

If the ECC_invalid_flag 36 is set for an error correction code 34 read by the ECC correcting circuitry 32, then this indicates that the error correction code 34 is not valid and accordingly cannot be used to detect or correct any bit errors within the one or more data values stored within the cache line 20. The scrub controller 38 may trigger the partially written cache line (data block) to have its written portion flushed back to the main memory following which a known value can be written to and read from the whole cache line to check its proper operation. The action of the memory scrub control circuitry 38 in periodically triggering such scrub operations has the action of bounding the time for which a cache line 28 may not be protected by an ECC code and is vulnerable to corruption. Thus, if a particular partially written cache line 28 persists for a long time within the level 1 cache memory 10, then at some stage it will be subject to a scrub operation in which it will be flushed to the main memory 6

Figure 3:
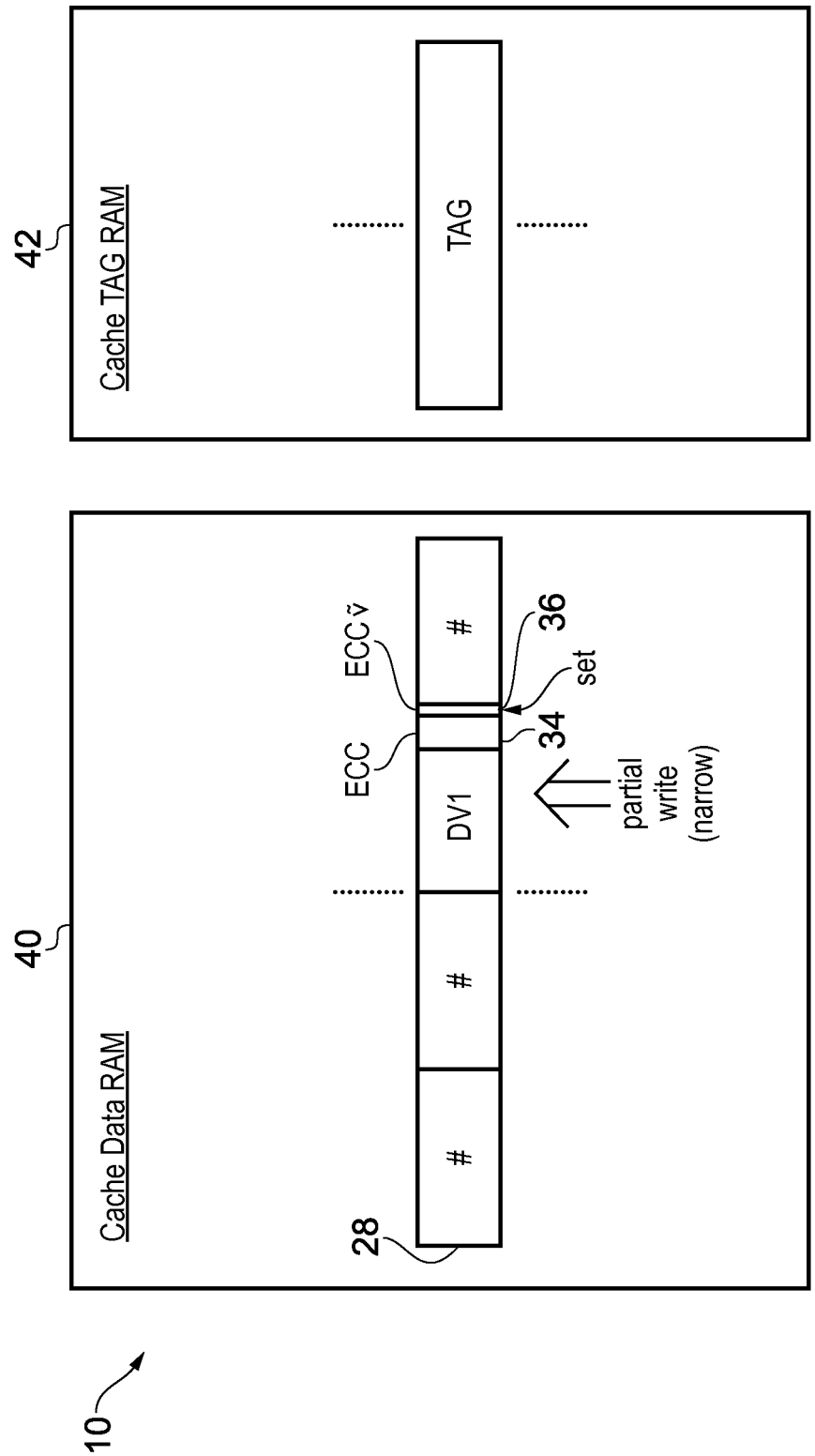
FIG. 3 schematically illustrates a cache memory including a data RAM and a TAG RAM.

FIG. 3 schematically illustrates a part of a level 1 cache 10 including a data RAM 40 and a TAG RAM 42. The data RAM 40 stores cache lines 28 each comprising, in this example embodiment, four data values DV0-DV3. These data values may be individual data bytes and the cache line as a whole stores a data word (32-bits). In the example illustrated, a partial write (narrow write) has occurred which writes only the data value DV1 comprising the second byte within the data word as a whole. The remaining data values are not written and may be blank or contain meaningless data. The cache line 28 may contain data validity bits which provide data value granularity rather than classifying an entire cache line 28 as either valid or invalid. Also stored within the data RAM 40 are ECC codes 34 determined based upon all of the values of a data block (DV) when all of such a data block is available within the cache line 28. When all of the data of a data block within the cache line is not available, then an ECC_invalid_flag 36 is set to indicate that the ECC code 34 is not valid. The ECC codes 34 and invalid flags 36 may be grouped together in some embodiments. This embodiment shows an ECC code for each word in a cache line. Other embodiments may use one ECC code for an entire cache line.

The TAG RAM 42 includes address TAG values representing the mapping between cache lines and areas within the memory address space of the main memory 6.

Figure 4:
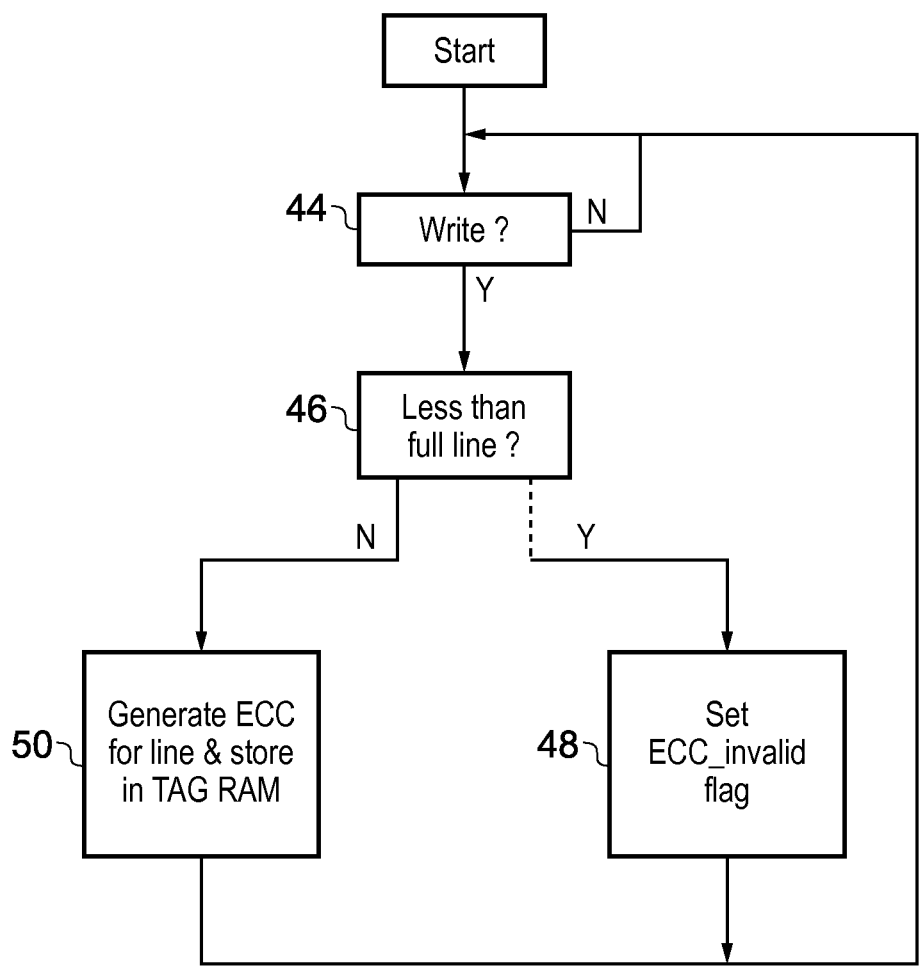
FIG. 4 is a flow diagram schematically illustrating detection of partial line writes.

FIG. 4 schematically illustrates the action of the ECC generating circuitry 30 when a partial line write is detected. At step 44 processing waits until a write is detected. Step 46 then determines whether or not the write is to less than the full cache line 28. If the write is to less than the full cache line (i.e. to a proper subset of the data values within a cache line) then step 48 sets the ECC_invalid_flag 36 for that cache line 28. If the determination at step 46 is that the full cache line (or more generally data block) has been written (as will be the case in the majority of instances), then step 50 serves to generate the ECC value 34 for that cache line 28 and this is then stored within the TAG RAM 42.

Figure 5:
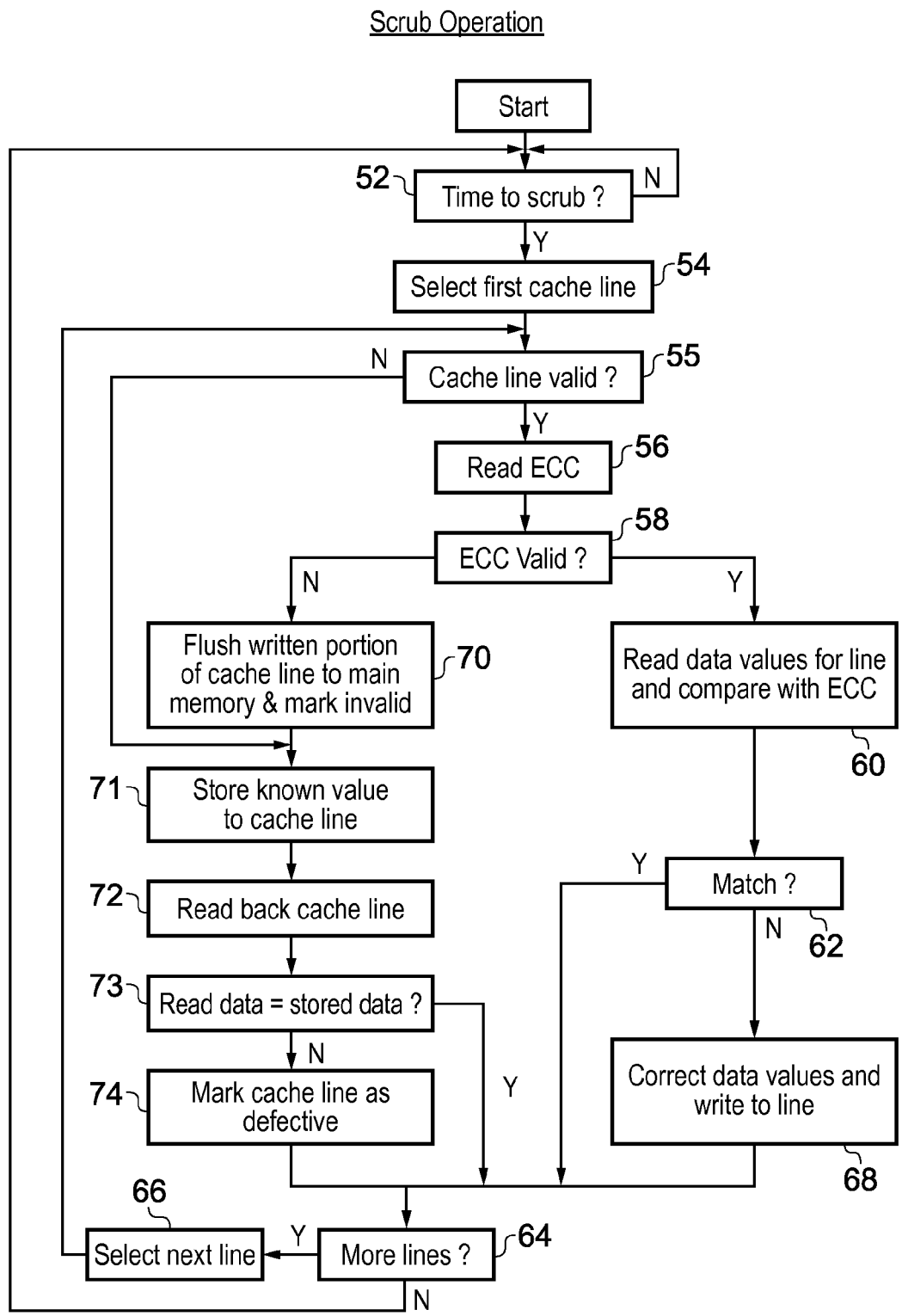
FIG. 5 is a flow diagram schematically illustrating a memory scrub operation.

FIG. 5 schematically illustrates a memory scrub operation of the type controlled by the scrub controller 38. At step 52 processing waits until a timer signal is received indicating that it is time to initiate a memory scrub operation. This timer signal could be received periodically based upon a timer circuit or may be generated when a predetermined duration of idle has been detected. Other forms of controlling scrub operations are also possible.

When a scrub has been initiated, step 54 selects the first line within the cache memory 10. Step 55 determines if the cache line is marked as invalid. If the cache line is valid, then processing proceeds to step 56. Step 56 then reads the ECC code 34 for that first cache line (this embodiment uses one ECC code for a whole cache line) together with its ECC_invalid_flag 36. Step 58 determines whether or not the ECC code 34 is valid in dependence upon the ECC_invalid_flag value.

If the ECC code is valid, then step 60 serves to read the data values DV0-DV3 from the cache line and uses these to calculate another ECC value which is compared to that read at step 56. Step 62 determines whether or not the read ECC value 34 matches the newly calculated ECC value. If there is a match, then the data values have not been corrupted and processing proceeds to step 64 where a determination is made as to whether there are any more lines within the cache memory 10 for which a scrub operation is needed. If there are no such further cache lines, then processing returns to step 52 to await the next time to perform a scrub operation. If there are more lines to be scrubbed, then step 66 selects the next line and processing returns to step 56. This example scrubs all of the cache lines in response to one trigger. Other embodiments may scrub a few cache lines at a time in a round robin fashion such that all cache lines are eventually scrubbed. Other arrangements are also possible.

If the determination at step 62 was that the read ECC value 34 and the newly calculated ECC value do not match, then step 68 serves to use the read ECC value 34 to correct the data values DV0-DV3 providing the number of bit errors within these data values does not exceed the maximum capability of the ECC code for correction. Processing then proceeds to step 64.

If the determination at step 58 was that the ECC code was marked as invalid by the ECC_invalid_flag 36, then processing proceeds to step 70 where the partially written cache line (data block) is flushed back to the main memory. Step 71 then stores a known value to the cache line, e.g. 0x5A5A . . . Step 72 reads back the value from the cache line and step 73 compares the read back value with the stored value. If the read back value does not equal the stored value, then this indicates the cache line is defective and is marked as such (possibly using a signal to an external pin). If the comparison at step 73 was a match, then step 74 is bypassed. Step 64 then determines if there are more cache lines to scrub.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
    error code generating circuitry configured to generate an error code for a data block comprising a plurality of data values, said error code having a value dependent upon said plurality of data values;
    a memory configured to store one or more data values of said data block and said error code; and
    memory scrubbing circuitry coupled to said memory and configured to perform a periodic memory scrub operation in which data values of said data block are checked with said error code and, if said data block has an invalid error code, then all data values for said data block are written to said memory and said error code is updated;
    wherein said error code generating circuitry is configured such that:
    (i) when one or more data values within said data block are written to said memory and all data values within said data block are stored within said memory, said error code generating circuitry generates an updated value of said error code for said data block; and
    (ii) when one or more data values within said data block are written to said memory and a proper subset of said data values within said data block are stored within said memory, said error code generating circuitry marks as invalid said error code for said data block, and
    wherein said memory is part of a memory hierarchy including at least one higher order memory and said memory scrubbing circuitry is configured to read any data values of said data block not present within said memory from said higher order memory.

2. Apparatus as claimed in claim 1, comprising
    error detecting circuitry coupled to said memory and configured to read said error code when said data block is read from said memory and, if said error code is not marked as invalid, then to trigger an error response if said error code does not match said data block.

3. Apparatus as claimed in claim 2, wherein said error code is an error correcting code, said error detecting circuitry is error correcting circuitry and said error response is to use said error correcting code to correct at least one error within said data block.

4. Apparatus as claimed in claim 1, wherein said error code is marked as invalid using one of:
    (i) an error-code-invalid flag; and
    (ii) a dedicated value of said error code.

5. Apparatus as claimed in claim 1, wherein said error code is one of:
    (i) an error correcting code for said data block;
    (ii) a parity code for said data block; and
    (iii) an error detecting code for said data block.

6. Apparatus as claimed in claim 1, wherein said memory is a cache line within a cache memory and said error code generating circuitry is configured to generate error codes for a plurality of cache lines within said cache memory.

7. Apparatus as claimed in claim 6, wherein said cache memory comprises a TAG RAM for storing TAG values and a data RAM for storing said plurality of data values and said error code is marked as invalid with an invalid flag stored in said data RAM.

8. Apparatus as claimed in claim 6, wherein said cache memory is a level one cache memory.

9. Apparatus as claimed in claim 1, comprising processing circuitry configured to execute program instructions and wherein, in response to a program instruction, said processing circuitry performs a partial write of a proper subset of said data values within said data block.

10. Apparatus as claimed in claim 1, wherein said data block is mapped to a block of memory addresses within a memory address space and said memory is configured to store one or more current data values for respective memory addresses within said memory address space.

11. Apparatus as claimed in claim 1, wherein said memory is a buffer memory within interconnect circuitry of an integrated circuit.

12. Apparatus as claimed in claim 1, wherein said memory is a write buffer memory within a memory controller.

13. Apparatus as claimed in claim 1, wherein said plurality of data values are a plurality of data bytes and said data block is a data word.

14. Apparatus for processing data comprising:
    error code generating means for generating an error code for a data block comprising a plurality of data values, said error code having a value dependent upon said plurality of data values; and
    memory means for storing one or more data values of said data block and said error code; and
    memory scrubbing means coupled to said memory means for performing a periodic memory scrub operation in which data values of said data block are checked with said error code and, if said data block has an invalid error code, then all data values for said data block are written to said memory and said error code is updated;
    wherein said error code generating means is configured such that:
    (i) when one or more data values within said data block are written to said memory means and all data values within said data block are stored within said memory means, said error code generating means generates an updated value of said error code for said data block; and
    (ii) when one or more data values within said data block are written to said memory means and a proper subset of said data values within said data block are stored within said memory means, said error code generating means marks as invalid said error code for said data block; and
    wherein said memory means is part of a memory hierarchy including at least one higher order memory and said memory scrubbing means is configured to read any data values of said data block not present within said memory means from said higher order memory.

15. A method of processing data comprising the steps of:
    generating an error code for a data block comprising a plurality of data values, said error code having a value dependent upon said plurality of data values;
    storing within a memory one or more data values of said data block and said error code; and
    performing with memory scrubbing circuitry a periodic memory scrub operation in which data values of said data block are checked with said error code and, if said data block has an invalid error code, then all data values for said data block are written to said memory and said error code is updated;
    wherein said step of generating operates such that:
    (i) when one or more data values within said data block are written to said memory and all data values within said data block are stored within said memory, said step of generating generates an updated value of said error code for said data block; and
    (ii) when one or more data values within said data block are written to said memory and a proper subset of said data values within said data block are stored within said memory, said step of generating marks as invalid said error code for said data block; and
    wherein said memory is part of a memory hierarchy including at least one higher order memory and said memory scrubbing circuitry reads any data values of said data block not present within said memory from said higher order memory.

* * * * *